Jan. 6, 1942.  C. G. MOLLER, 3D  2,268,764
HYDRAULIC CONTROL
Filed Aug. 5, 1939  2 Sheets-Sheet 1

INVENTOR
Conrad Gerhard Moller, 3rd
BY
Duell, Kane and Smoot
ATTORNEYS

Jan. 6, 1942.  C. G. MOLLER, 3D  2,268,764
HYDRAULIC CONTROL
Filed Aug. 5, 1939  2 Sheets-Sheet 2
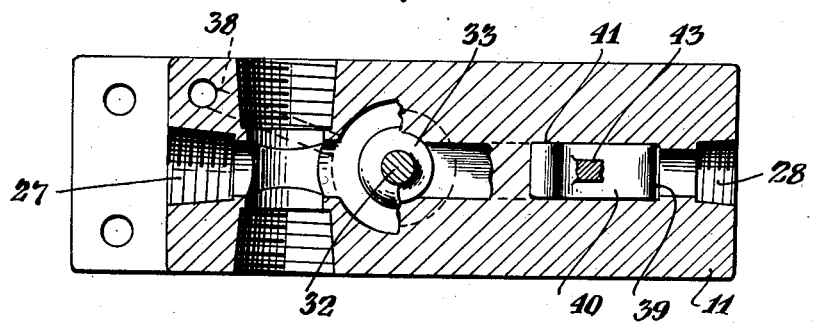
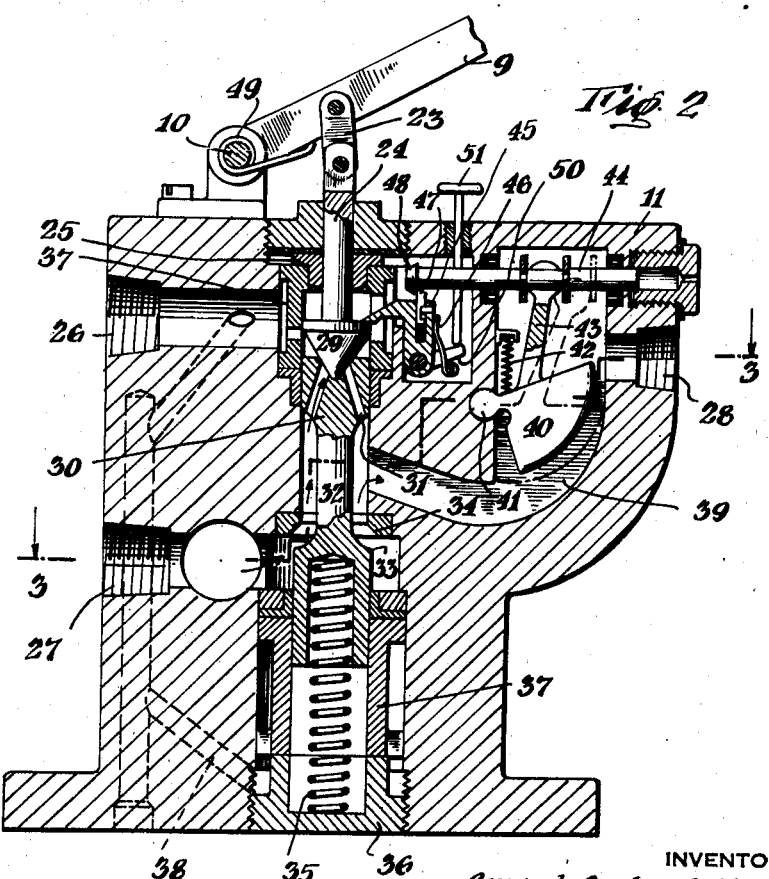
INVENTOR
Conrad Gerhard Moller, 3RD
BY
Duell, Kane and Smoot
ATTORNEYS Patented Jan. 6, 1942

2,268,764

UNITED STATES PATENT OFFICE 2,268,764

HYDRAULIC CONTROL

Conrad Gerhard Moller, 3rd, New Canaan, Conn., assignor to The Acrotorque Company, Cleveland, Ohio, a corporation of Connecticut Application August 5, 1939, Serial No. 288,494

8 Claims. (Cl. 137—153)

This invention relates to a structurally and functionally improved valve or hydraulic control capable of use in numerous different associations but primarily intended to be employed for the control of apparatus actuated by fluid under pressure.

In certain aspects, it is an object of the present invention to provide an improved structure over that disclosed in the prior United States Letters Patent in the name of Elias Orshansky, Jr., and C. Gerhard Moller, 3rd, 2,225,082.

By means of the present invention, there is provided an apparatus which will function in an automatic or semi-automatic manner and be responsive to the velocity of flow, per unit of time, of the liquid passing therethrough. Consequently, the control may be interposed between the source of fluid under pressure and apparatus to be controlled by such fluid; such hydraulic control functioning at the will of the operator to permit any desired flow of fluid to the apparatus and serving to terminate such flow as soon as the apparatus has reached a predetermined condition.

It is a further object of the invention to construct a control of this nature which may be applied to installations in which widely varying flows occur. In other words, a unit embodying the present teachings will be equally useful when applied to apparatus which requires a certain volume of liquid to operate, or to apparatus requiring only a small portion of such volume.

A further object is that of constructing a control which will function under minimum fluid pressure and regardless of the total volume of liquid flowing through the same.

Another object is that of providing a control which will operate in a satisfactory manner and regardless of the viscosity of the liquid incident to temperature variations.

An additional object is that of furnishing an apparatus of this nature which will embody relatively few parts, each individually simple and rugged in construction, these parts functioning over long periods of time with freedom from all difficulties.

With these and further objects in mind, reference is had to the attached sheets of drawings illustrating one practical embodiment of the invention and in which:

Fig. 2 is a sectional side view of the control per se; and

Fig. 3 is a sectional plan view taken along the lines 3—3 and in the direction of the arrows as indicated in Fig. 2.

Figure 1:
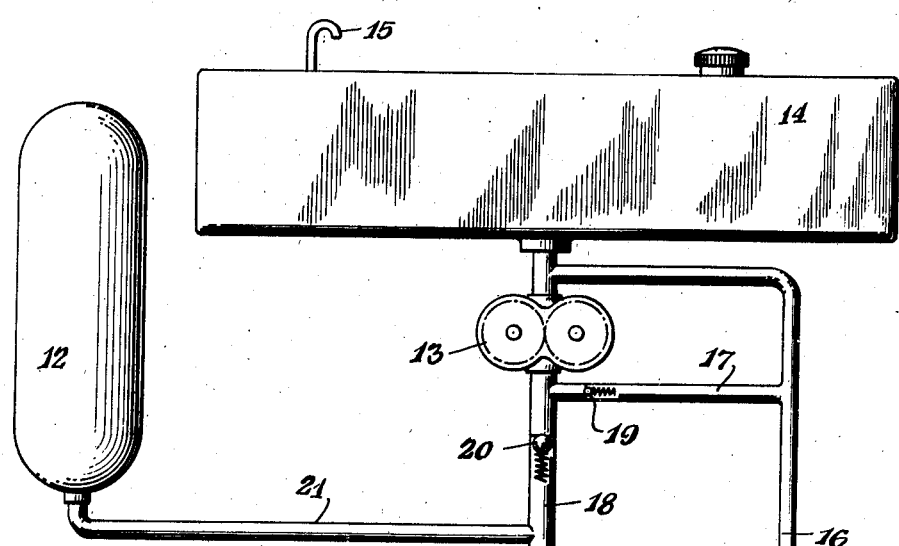
Fig. 1 is a somewhat diagrammatic view of a layout such as might be used in an aircraft installation and showing the present control in association therewith.
Figure 1:
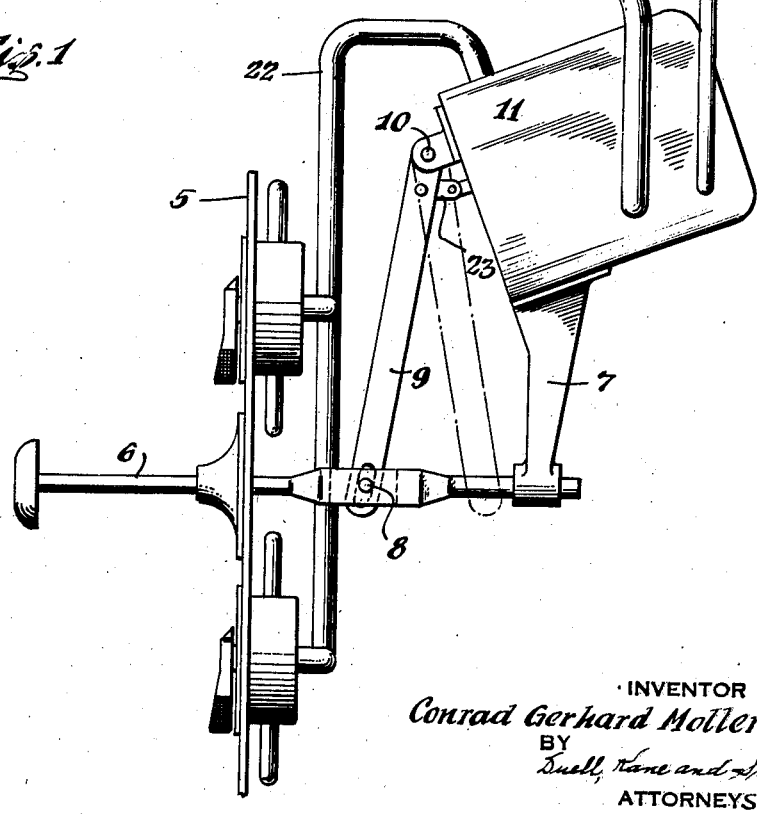

As afore brought out, the embodiment illustrated in Fig. 1 is of primary utility in association with aircraft. With this thought in mind, a system such as to be employed in connection with aviation technique has been illustrated. Thus, the numeral 5 indicates a panel from which an actuating handle or rod 6 extends. To the rear of this panel, the rod may be guided by extending through a support 7. By means of a pin and slot connection 8, rod 6 may be coupled to a lever 9 which preferably has its inner end pivotally secured as at 10 to casing 11.

Numeral 12 indicates a high pressure accumulator tank and 13 a high pressure pump. The latter may be driven by any suitable motor (not shown) and has its intake coupled to a storage tank 14 conveniently provided with a vent 15. The return line or drain 16 may be coupled to the outlet of the tank and a branch 17 may be furnished connecting line or tube 16 with the main supply or pressure line 18. A check valve 19 is conveniently disposed within branch 17 and a further check valve 20 is conveniently arranged within line 18.

Both of the lines 16 and 18 are connected to casing 11 and a branch 21 may connect tank 12 to line 18. Also extending from casing 11 is a supply pipe or line 22 which is connected to apparatus to be controlled such as, for example, the hydraulic pitch varying and feathering motor associated with a driving propeller.

In such an installation, it will be understood by those skilled in the art that a pilot should be provided with a control whereby, while giving full attention to the navigation of a plane, he will be assured that the propeller will quickly reach a condition which he desires and without requiring his constant attention to effect such result. This is one of the instances in which the present control is of value. It will, however, be understood that this control may be employed in numerous different associations and that the description in connection with Fig. 1 is accordingly to be regarded in an illustrative rather than a limiting sense.

Now referring to Figs. 2 and 3 in which the control or valve has been illustrated, it will be seen that the lever 9 has been indicated, and this lever is, for example, connected by a link 23 to a rod 24. The rod extends through suitable packing 25 to tne interior of the casing 11. It is also to be noted that port 26 of the casing is to be coupled to line 16, port 27 to line 18 and port 28 to line 22.

The casing is formed with a bore within which rod 24 extends. The lower end of this rod mounts a valve 29 acting against a seat which forms part of a body 30 mounted for reciprocation within the aforementioned bore. This body is formed with passages 31 which are covered when valve 29 is upon its seat. Extending below the body is a plunger 32 enlarged to furnish a valve body 33. A seat for the latter is furnished as at 34 and is ground so that a line seal is provided which prevents the passage of any fluid when valve 33 engages seat 34.

Such a position is normally assumed by the valve incident to the fact that a spring 35 is provided which is interposed between a plug 36, sealing the lower end of the bore, and the base of a countersunk portion formed in body 33. The movements of the valve may be guided by mounting liners 37 within the bore, it being noted that similar liners conveniently provide a guide for the movements of member 30. Also, at this time it will be observed that the base of the bore may be connected, by passages 38, to the passage which terminates adjacent port 26. In this manner, fluid which is trapped will be discharged from the casing without blocking the parts or establishing back pressure.

Port 27 is continued in a passage terminating below the valve seat 34. Coupled to the bore at a point above such seat is a passage 39 which communicates with port 28. It is obvious when lever 9 is rocked inwardly to correspondingly project rod 24, that valve 29 will move into engagement with its seat to obstruct passages 31. Continued movement of the parts will result in valve 33 moving away from its seat 34. When this occurs, the fluid under pressure will enter port 27 and flow through the casing to discharge from port 28. Conversely, when rod 24 is elevated, valve 33 will move into contact with seat 34 to prevent such flow occurring and thereafter valve 29 will move out of contact with its seat to allow fluid within the bore and passage 39 to be discharged through port 26. Also, any excess fluid, or fluid which drains back through port 28, may flow through passage 39, passages 31, and so through port 26.

Before departing from a consideration of this structure, it is wise to note that by having valve 33 in conjunction with its seat 34 provide a "line-seal," only a relatively slight pressure will be necessary to cause a rupturing of the fluid film between the seat and valve, to thus prevent any effective leakage or seepage at this point. Such pressure, as is necessary, is readily furnished by the relatively weak spring 35. Moreover, the valve 33 does not seat either against or with the pressure of the fluid. Rather, it is of the "balanced" type. Accordingly, even when high pressures are employed, and if the velocity of the fluid and skin friction between the latter and the body of the valve are high, this will not cause the valve to be seated.

Now with a view to providing means which will permit of a wide range of flow occurring from port 27 to port 28 without differences in such range requiring the readjustment or reconstruction of the apparatus, and also with a view to preventing undue pressure losses, it will be observed that a compensating structure such as is shown, especially in Fig. 2, may be employed.

Viewed from one aspect, such a structure is responsive to the volume of flow per unit of time and to cause an automatic adjustment or compensation such that under substantially all conditions, the velocity of flow will be substantially constant at a given point within the casing. At the same time, when this structure has once adjusted itself during a given operation, it will be immediately responsive to a diminution in the volume of flow per unit of time, such as would occur when the receiving apparatus connected thereto receives a sufficient volume of fluid to become substantially charged.

One form of structure which has been found satisfactory to achieve this result is a mechanism involving a cam-shaped member 40, pivotally supported by the casing as at 41. By a member or vane of this nature is meant an element having a constantly diminishing radius. Secured to or forming a part of member 40 is an arm 43, connected to a rod 44. When no flow occurs from port 28, this member will assume a position as indicated by dot and dash lines. Such a position by the member may be established through the action of gravity or else such action may be supplemented by a spring 42. When in such a position, the member will have a minimum clearance from the wall of the passage connecting the bore with port 28.

When, however, a flow of fluid occurs through passage 39, member 40 will rock upwardly to an extent corresponding to the velocity of fluid flow through the passage in a given time interval. In other words, the volume of flow may be large and in which case, member 40 will rock upwardly to more or less its limit of movement. If the volume of flow required to operate the apparatus connected to port 28 is relatively small, member 40 may, for example, move merely from the position indicated in dot and dash lines to that shown in full lines in Fig. 2. As such flow terminates, member 40 will again rock downwardly. Such movements of the parts will, of course, result in a shifting of the rod 44. However, it will be clear from the foregoing that member 40 will, according to the volume of liquid passing through passage 39, adjust itself to present a somewhat restricted orifice. In other words, the area of the orifice between the edge of member 40 and the sidewall of passage 39 will vary substantially in direct proportion to the volume of flow per unit of time. Thus, under operative conditions, the rate of flow, or velocity of the liquid through the most constricted portion of the passage 39, will, under all conditions, be somewhat constant. It will be observed that, as shown in Fig. 2, the upper portion of member 40 may, under operative conditions, extend into the zone of the passage communicating with port 28. Accordingly, the point of maximum constriction of the effective path of flow through the passage 39 is susceptible of variation.

With a view to providing means which will function automatically, upon the apparatus connected to line 22 having received a sufficient amount of fluid, to close valve 33, it will be observed that a detent 45 is pivotally mounted adjacent valve 29 and in a position at which it may overlie the same. A spring 46 serves to normally move this detent to such a position.

A spring-pressed latch element 47 is carried by the detent and is cooperative with a flared shoulder portion 48, formed adjacent the inner end of rod 44. It is thus apparent that with lever 9 swung to its outermost position—as, for example, by spring 49—rod 24 will assume a corresponding position. Under these circumstances, valve 29 will have its upper edge disposed below the end of detent 45, as viewed in Fig. 2.

When, however, an operator shifts rod 6 inwardly to correspondingly rock lever 9, valve 29, in moving towards its seat upon body 30, will cam against the detent, which thereafter and under the action of spring 46 will move to the position shown in Fig. 2.

In such position, a flow of fluid may occur from port 27 to port 28. This flow will not be fully established until after member 40 has moved upwardly as afore described and for a distance proportionate to the volume of flow per unit of time which is occurring. In such upward movement of the member, rod 44 will shift inwardly to cause the collar portion 48 of the same to override latch 47 as shown in Fig. 2.

As the rate of flow diminishes, member 40 will move downwardly. This will cause rod 44 to move to the right as viewed in Fig. 2. Such movement will cause the detent 45 to be rocked outwardly incident to the engagement between latch 47 and collar 48. This in turn will permit valve 29 to move upwardly to thus seat valve 33.

Consequently, an automatic release of the parts is assured but if the operator should desire to establish a further flow, this could readily be accomplished by simply again depressing lever 9. Under such operation, the lever would be maintained in depressed position by the operator manually restraining it from upward movement. Such a functioning of the parts might be desired where the control was coupled to a propeller feathering mechanism and where it was desired to assure further operation of such mechanism. In any event, and upon completion of the operation, all excess fluid will discharge through passages 38 or otherwise through port 26.

Under certain circumstances, it might be desired to interrupt the action of the control after operation of the same has once been initiated. With this thought in mind, the detent 45 may be continued in the form of an arm 50 engageable by rod 51 extending beyond the casing. Obviously, upon this rod being projected, detent 45 will be rocked to release valve 29. Accordingly and in such event, valve 33 will forthwith seat and the flow through the parts will be interrupted.

From the foregoing it will be understood that, among others, the several objects of the invention, as specifically aforenoted, are achieved. Obviously, numerous changes in construction and rearrangements of the parts might be resorted to without departing from the spirit of the invention as defined by the claims.

I claim:

1. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means functioning upon a diminution in the rate of flow occurring to automatically close said main valve and open said second valve, said closing means being disposed in advance of said outlet opening and providing a movable flow-obstructing member furnishing an orifice, the area of which varies according to the position of said member and substantially in direct proportion to the volume of flow per unit of time from the inlet to the outlet opening.

2. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last named means for maintaining said main valve in open position, means responsive to a change in the rate of flow of the liquid from said inlet to said outlet opening to render said valve maintaining means inoperative and to cause said main valve to prevent further flow from said inlet to said outlet opening and to open said second valve to permit a flow past the same, said flow-responsive means including means disposed in advance of said outlet opening and providing a movable flow-obstructing member, furnishing an orifice, the area of which varies according to the position of said member and in direct proportion to the volume of flow per unit of time from the inlet to the outlet opening.

3. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last named means for maintaining said main valve in open position and means disposed within one of said passages and in advance of said discharge opening to provide, in conjunction with the wall of said passage, an orifice of a variable area and proportionate to the volume of flow per unit of time through said orifice providing passage, said means being also responsive to a sufficient diminution in the volume of flow per unit of time of the liquid from said inlet to said outlet opening to cause said main valve to close and prevent further flow from said inlet to said outlet opening and to open said second valve to permit a flow past the same.

4. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last named means for maintaining said main valve in open position, means movably mounted within said casing and extending into said passage to provide in conjunction with the wall of said passage, an orifice, the area of which varies according to the position of said movably mounted means and substantially in direct proportion to the volume of flow per unit of time from the inlet to the outlet opening, said means shifting responsive to a diminution in the volume of flow per unit of time of the liquid from said inlet to said outlet opening to cause said main valve to close and prevent further flow from said inlet to said outlet opening and to open said second valve to permit a flow past the same.

5. A control for liquids including a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve, means connected to said last named means for maintaining said main valve in open position, means responsive to a sufficient diminution in the volume of flow per unit of time of the liquid from said inlet to said outlet opening to cause said main valve to close and prevent further flow from said inlet to said outlet opening and to open said second valve to permit a flow past the same and further manually operable means for causing a movement of said flow responsive means, whereby said main valve may be manually closed during normal flow conditions.

6. A control for liquids including a body formed with an inlet opening adapted to be connected to a source of fluid under high and substantially continuous pressure, said body being formed with an outlet opening to be connected to an apparatus which is to be rendered operative upon being substantially charged with liquid under pressure, said body being additionally formed with a discharge opening and with passages connecting all of said openings, a valve within said passages and to control the flow of fluid from the inlet to the outlet opening thereof, means for opening said valve whereby to permit of a flow from the inlet to the outlet opening, means for maintaining said valve in open position, a second valve for controlling the flow of liquid from said passages and outlet opening to the discharge opening, means whereby said second valve prevents any flow of liquid past the same and to said discharge opening, while said maintaining means retains said first named valve in open position, means responsive to a sufficient diminution in the volume of flow per unit of time of liquid from the outlet opening of said body to render said maintaining means inoperative whereby said first named valve will close and means movably mounted by said body and extending into one of said passages to provide an orifice through which fluid may flow and the area of which orifice will be proportionate to the volume of liquid flow per unit of time and means whereby said second valve will substantially, with the closing of the first valve, open to permit a discharge of fluid through said discharge opening.

7. A control for liquids including a body formed with an inlet and an outlet opening, said inlet opening being adapted to be connected to a source of liquid under high and continuous pressure, said outlet opening being adapted to be connected to an apparatus to be rendered operative upon being substantially charged with liquid under pressure, a valve disposed within said body, means for normally maintaining said valve in a position such that liquid flow from said inlet to said outlet opening is interrupted, means for opening said valve to permit such flow, means for maintaining said valve in such opened position, means operative solely upon a sufficient diminution in the volume of flow per unit of time of liquid occurring from said outlet opening, and as the apparatus connected to the outlet opening reaches a substantially charged condition, to render said valve maintaining means inoperative whereby said valve returns to closed position and means movably mounted by said body and extending into one of said passages to provide an orifice through which fluid may flow and the area of which orifice will be proportionate to the volume of liquid flow per unit of time.

8. A hydraulic control including a body formed with inlet and outlet openings and passages connecting said openings, a valve interposed within said passages, means for urging said valve to closed position whereby, to obstruct the flow of liquid from said inlet to said outlet opening, means whereby said valve may be shifted to opened position, means for automatically maintaining said valve in such open position, a member movably mounted by said body and furnishing an orifice through which liquid will flow when said valve is in unseated position, the area of said orifice varying according to the position of said member and substantially in direct proportion to the volume of flow per unit of time from the inlet to the outlet opening, means for connecting said member with said maintaining means to render the latter inoperative upon said member moving in a predetermined direction and said member moving in such direction upon a sufficient diminution in the volume of liquid flow per unit of time occurring from said inlet to said outlet opening.

CONRAD GERHARD MOLLER, 3RD.